No. 668,050. Patented Feb. 12, 1901.
S. B. PECK.
CONVEYER.
(Application filed Sept. 15, 1900.)
(No Model.)
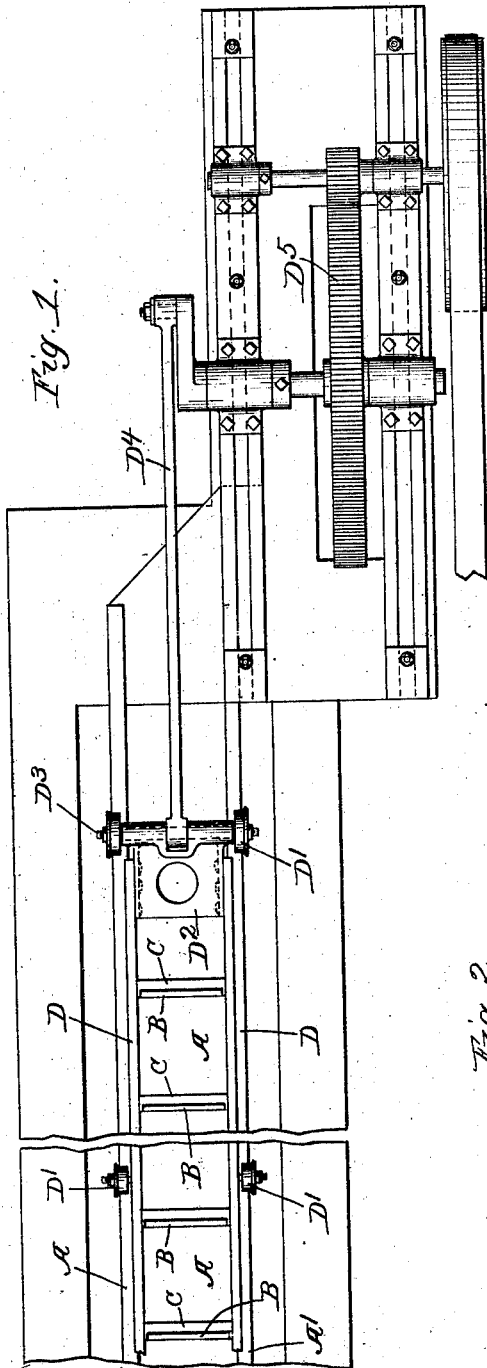
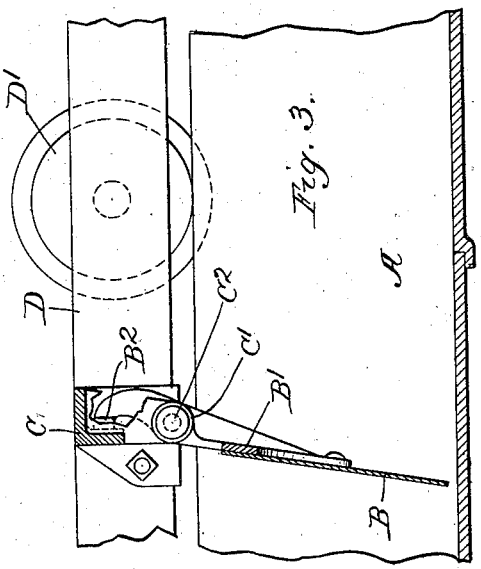
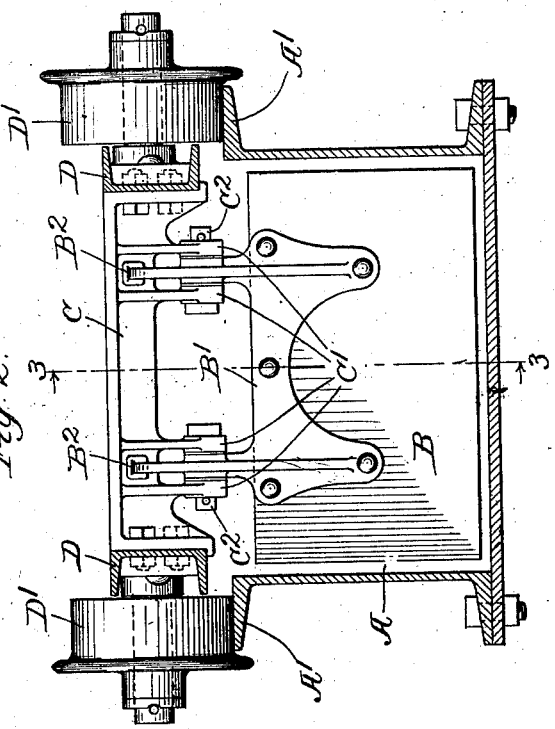
Witnesses.
Edward T. Wray.
Homer L. Kraft
Inventor.
Staunton B Peck
by Parker & Carter
his Att'ys.

UNITED STATES PATENT OFFICE.

STAUNTON B. PECK, OF CHICAGO, ILLINOIS, ASSIGNOR TO THE LINK BELT MACHINERY COMPANY, OF SAME PLACE.

CONVEYER.

SPECIFICATION forming part of Letters Patent No. 668,050, dated February 12, 1901.

Application filed September 15, 1900. Serial No. 30,110. (No model.)

*To all whom it may concern:*

Be it known that I, STAUNTON B. PECK, a citizen of the United States, residing at Chicago, in the county of Cook and State of Illinois, have invented a certain new and useful Improvement in Conveyers, of which the following is a specification.

My invention relates to conveyers, and has for its object to provide a new and improved conveyer, of which the following is a description, reference being had to the accompanying drawings, wherein—

Figure 1 is a plan view, with parts omitted, showing a conveyer embodying my invention. Fig. 2 is a cross-section through the conveyer. Fig. 3 is a section on line 3 3, Fig. 2.

Like letters refer to like parts throughout the several figures.

In carrying out my invention I provide a suitable receptacle or trough A, in which the material to be acted upon is placed. Contained within the trough are a series of movable or reciprocating engaging devices or plates B, which engage the material in the receptacle. These engaging devices are preferably connected together in some suitable way, and means are provided for moving or reciprocating them. As herein shown, the engaging devices or plates B are each movably connected with a suitable support C. The supports C are preferably connected together, so that they can be moved along the receptacle simultaneously. The engaging devices or plates B are connected with these supports, so that they are rigidly held when the supports are moved forward, thus carrying the material in the receptacle forward, but are free to give or move with relation to the supports when the supports are moved backward. This permits the engaging devices or plates to swing, so as to ride over or pass the material in the receptacle during the backward movement and then engage this material and carry it forward during the forward movement. The engaging devices or plates B may be connected with the supports C in any desired manner. As herein shown, the plates are connected to a carrying-piece B', having one or more upwardly-projecting parts $B^2$. The upwardly-projecting part or parts $B^2$ are pivotally connected to the support C in any desired manner. As illustrated, the support C is provided with downwardly-projecting opposed parts C', having holes therethrough, and the part $B^2$ is interposed between them, a pin, bolt, or the like $C^2$ being passed through the holes in the several parts, as shown in Fig. 2. The ends of the upwardly-projecting parts $B^2$ extend past the pivotal point and are adapted, when the engaging device B is in its operative position, to come into contact with the support C or some part associated therewith, so as to prevent the backward movement of the plate or engaging device. This construction, however, permits the lifting of the engaging device or plate B when the support C is moved backwardly, thus rendering it inoperative during this backward movement. This construction forms a stop or limiting device located above the pivotal point or point of attachment of the engaging device or plate B and its support C. It is of course evident that the plate B may be attached in any other desired manner to the support, and I have only shown one construction, which I consider sufficient to make my invention clear. Any desired number of plates or engaging devices may be used, and they may be separated any desired distance, these conditions depending, of course, upon the length of the conveyer and the conditions to be met.

The several supports C are connected together at the sides of the receptacle or trough by the connecting-pieces D. I prefer to provide the connecting-pieces with rollers or wheels D', located at suitable intervals, said rollers or wheels being supported by a suitable trackway of any desired description, so that the connecting-pieces and associated parts can be easily reciprocated. In the drawings I have shown the sides of the receptacle or trough A as being made of channel-irons, the upper angle or flange A' acting as a trackway for the supporting rollers or wheels D'. The connecting-pieces are attached in any desired manner to some suitable moving mechanism. As shown in Fig. 1, these supports are connected together by a cross piece or plate $D^2$, which is connected to an axle or shaft $D^3$, a suitable connecting-rod $D^4$ being connected with said shaft. An engine or other motor $D^5$ is connected with the connecting-rod, so as to reciprocate the mechanism.

I have illustrated in detail one particular construction embodying my invention; but it is of course evident that the parts may be greatly varied in many particulars, and I therefore do not limit myself to the construction shown.

The use and operation of my invention are as follows: When it is desired to use the conveyer, the motor is started, so as to reciprocate the connecting-pieces D and the mechanism associated therewith. The material to be acted upon is then placed in the receptacle or trough. When the connecting-pieces D and the engaging devices B are moving forward, the upwardly-projecting parts $B^2$ engage the supports C and hold the plates or engaging devices in their operative position, as shown in Fig. 3. It will thus be seen that as these plates are moved forward they engage the material in front of them and move it along toward the point desired. When the parts are moving backward, it will be seen that the plates or engaging devices B are free to lift or move upwardly, so as to pass over the material in the trough, and thus the device is rendered inoperative, as it were, during this backward movement. When the parts are again moving forward, the upwardly-projecting parts $B^2$ engage the support C, thus holding the plates rigid, so that they carry the material in the trough forward with them.

It will be seen that by this construction there is nothing projecting down into the receptacle or trough except the engaging devices B and that the stop or limiting device is entirely above these plates and their connection with the support, so as to leave the receptacle or trough free of any obstructing parts which have to be dragged backward through the material acted upon. This construction takes less power and saves the wear on the parts and injury to the material acted upon. It will also be seen that the connecting device for connecting the several plates B together is located at the side of the trough, so as to leave the top unobstructed. This facilitates the insertion of the material into the trough and gives the device a much greater range of utility, as it permits the handling of material having large lumps, such as coal and stone, and also adhesive material, such as clay, sugar, and the like.

I claim—

1. A conveyer, comprising a receptacle in which the material to be acted upon is received, a series of engaging devices within said receptacle, a support provided with one or more downwardly-projecting parts to which each engaging device is movably connected, connecting-pieces to which said supports are removably attached, a carrying-piece separate from each engaging device and interposed between it and the support a stop device located above the connection between the support and the engaging device and adapted to limit the movement of the engaging device in one direction with relation to the support and permit its movement in the other direction, and means for relatively reciprocating said support and receptacle.

2. A conveyer, comprising a receptacle in which the material to be acted upon is received, a series of reciprocating engaging devices within said receptacle, a support provided with one or more downwardly-projecting parts to which each engaging device is movably connected, connecting-pieces to which said supports are removably attached, a carrying-piece separate from each engaging device and interposed between it and the support a stop device located above the connection between the support and the engaging device and adapted to limit the movement of the engaging device in one direction with relation to the support and permit its movement in the other direction, a connecting device at or near the sides of the receptacle which connects the supports together, so as to leave the entrance to the receptacle free, and a connection between said connecting device and a reciprocating mechanism.

3. In a conveyer, the combination of a long trough-like receptacle with a traveling device above the same and mechanism for reciprocating such traveling device back and forth, a series of downwardly-depending parts on such traveling device, a series of movable parts pivoted on such downwardly-depending parts and projecting upwardly at one end and downwardly into the trough-like receptacle at the other end, a series of removable plates of substantially the same area as the cross-section and attached to such movable parts and stop devices to engage the upper end of the pivoted parts, essentially as shown and described.

4. A conveyer, comprising a receptacle in which the material to be acted upon is received, a series of reciprocating engaging devices contained within said receptacle, a carrying-piece connected with each engaging device, a support to which each carrying-piece is movably connected, one or more projecting parts on each carrying-piece which project past the point where the carrying-piece is connected with the support, the upper end of said projecting part or parts engaging the support so as to act as a stop to limit the relative movement between the support and the engaging device.

5. A conveyer, comprising a receptacle in which the material to be acted upon is received, a series of reciprocating engaging devices contained within said receptacle, a carrying-piece connected with each engaging device, a support to which each carrying-piece is movably connected, one or more projecting parts on each carrying-piece which project past the point where the carrying-piece is connected with the support, the upper end of said projecting part or parts engaging the support so as to act as a stop to limit the relative movement between the support and the engaging device, a connecting device near the edge of said receptacle adapted to connect the several supports together, so as to leave the entrance to the receptacle unobstructed, and a reciprocating mechanism attached to said connecting device.

STAUNTON B. PECK.

Witnesses:
DONALD M. CARTER,
HOMER L. KRAFT.